United States Patent
Panian et al.

(10) Patent No.: US 10,585,734 B2
(45) Date of Patent: Mar. 10, 2020

(54) FAST INVALIDATION IN PERIPHERAL COMPONENT INTERCONNECT (PCI) EXPRESS (PCIE) ADDRESS TRANSLATION SERVICES (ATS)

(71) Applicant: QUALCOMM Incorporated, San Diego, CA (US)

(72) Inventors: James Lionel Panian, San Diego, CA (US); Derek Rohde, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/223,364

(22) Filed: Dec. 18, 2018

(65) Prior Publication Data
US 2019/0205278 A1  Jul. 4, 2019

Related U.S. Application Data

(60) Provisional application No. 62/613,602, filed on Jan. 4, 2018.

(51) Int. Cl.
*G06F 11/07* (2006.01)
*G06F 12/0831* (2016.01)
(Continued)

(52) U.S. Cl.
CPC ...... *G06F 11/0745* (2013.01); *G06F 12/0833* (2013.01); *G06F 12/1027* (2013.01);
(Continued)

(58) Field of Classification Search
CPC .............. G06F 11/006; G06F 11/0703; G06F 12/0808; G06F 12/0831; G06F 12/0833;
(Continued)

(56) References Cited

U.S. PATENT DOCUMENTS

| | | | |
|---|---|---|---|
| 6,728,210 B1 * | 4/2004 | El-Khoury | H04L 1/1806 370/231 |
| 7,707,383 B2 | 4/2010 | Saripalli | |

(Continued)

OTHER PUBLICATIONS

Author Unknown, "Address Translation Services," Revision 1.1, Jan. 26, 2009, PCI-SIG, Retrieved from https://composter.com.ua/documents/ats_r1.1_26Jan09.pdf, 54 pages.

(Continued)

*Primary Examiner* — Thomas J. Cleary
(74) *Attorney, Agent, or Firm* — Withrow & Terranova, PPLC

(57) ABSTRACT

Fast invalidation in peripheral component interconnect (PCI) express (PCIe) address translation services (ATS) initially utilize a fast invalidation request to alert endpoints that an address is being invalidated with a fast invalidation synchronization command that causes the endpoints to flush through any residual read/write commands associated with any invalidated address and delete any associated address entries in an address translation cache (ATC). Each endpoint may send a synchronization complete acknowledgement to the host. Further, a tag having an incrementing identifier for each invalidation request may be used to determine if an endpoint has missed an invalidation request.

35 Claims, 13 Drawing Sheets

(51) Int. Cl.
*G06F 12/1081* (2016.01)
*G06F 12/1027* (2016.01)
*G06F 13/42* (2006.01)

(52) U.S. Cl.
CPC ...... *G06F 12/1081* (2013.01); *G06F 13/4291* (2013.01); *G06F 2213/0026* (2013.01)

(58) Field of Classification Search
CPC .. G06F 12/0891; G06F 12/10; G06F 12/1027; G06F 13/161; G06F 13/4221; G06F 2213/0026; G06F 2213/0064; G06F 11/0727; G06F 11/073; G06F 11/0745; G06F 13/4265; G06F 13/4273; G06F 13/4282; G06F 13/4291; H04L 1/08; H04L 1/16; H04L 1/18; H04L 1/1809
See application file for complete search history.

(56) References Cited

U.S. PATENT DOCUMENTS

| | | | |
|---|---|---|---|
| 8,301,839 B2 | 10/2012 | Sundarrajan et al. | |
| 10,042,777 B2 | 8/2018 | Shacham et al. | |
| 2006/0230210 A1* | 10/2006 | Stanton | G06F 13/4027 710/301 |
| 2009/0144508 A1 | 6/2009 | Freimuth et al. | |
| 2013/0038792 A1* | 2/2013 | Quigley | A61H 19/00 348/515 |
| 2015/0103822 A1* | 4/2015 | Gianchandani | H04L 69/08 370/389 |
| 2018/0018190 A1 | 1/2018 | Heller | |
| 2018/0288179 A1* | 10/2018 | Bhatia | H04L 45/00 |
| 2019/0132085 A1* | 5/2019 | Shpiner | H04L 1/1896 |

OTHER PUBLICATIONS

Firoozjaei, M.D. et al., "Security challenges with network functions virtualization," Future Generation Computer Systems, vol. 67, Feb. 1, 2017, Elsevier B.V., pp. 315-324.
International Search Report and Written Opinion for PCT/US2018/066399, dated Apr. 5, 2019, 13 pages.

* cited by examiner

FAST INVALIDATION IN PERIPHERAL COMPONENT INTERCONNECT (PCI) EXPRESS (PCIE) ADDRESS TRANSLATION SERVICES (ATS)

PRIORITY CLAIM

The present application claims priority under 35 U.S.C. § 119(e) to U.S. Provisional Patent Application Ser. No. 62/613,602, filed on Jan. 4, 2018 and entitled "FAST INVALIDATION IN PERIPHERAL COMPONENT INTERCONNECT (PCI) EXPRESS (PCIe) ADDRESS TRANSLATION SERVICES (ATS)," the contents of which is incorporated herein by reference in its entirety.

BACKGROUND

I. Field of the Disclosure

The technology of the disclosure relates generally to address invalidation commands using address translation services (ATS) in a Peripheral Component Interconnect (PCI) express (PCIe) system.

II. Background

Computing devices have become increasingly common in modern society and have evolved from large cumbersome devices that performed only the most rudimentary functions to small, portable devices that operate as full multimedia platforms while providing telephony functions and the like. The increase in the functionality of such devices is attributable in part to the continued progress in shrinking more and more transistors into an individual integrated circuit (IC) to allow improved processing power in an increasingly small space. While ICs have continued to shrink in size, most computing devices continue to employ multiple ICs within the computing device to effectuate different functions. Such plural ICs necessitate that the ICs be able to communicate with one another. Various protocols and standards have been promulgated that set forth ways in which the ICs may communicate with one another.

One popular protocol is the protocol set forth in the Peripheral Component Interconnect (PCI) standard. PCI has gone through multiple permutations, but as of this writing, one of the more popular versions is PCI express (PCIe). One popular use of PCIe is for memory read/write commands from a peripheral element to a memory element through a host device. Such read/write commands are typically associated with an address within the memory to which the read/write command applies. Early iterations required that the peripheral use a physical address of the memory. As memory sizes increased, the address range exceeded the addressing capability of the peripherals, and the concept of a virtual address was introduced.

While the use of virtual addresses helped allow the peripheral to use all of the memory, the use of virtual addresses imposed a processing burden on the host as the virtual address had to be translated back to a physical address. Such processing also added latency to the read/write process. Accordingly, address translation was pushed back to the peripheral through the use of address translation services (ATS) and the use of an address translation cache (ATC) at the peripheral. The peripheral would use virtual addresses internally, but use the ATC to find a physical address. The physical address located in the ATC would be sent with the read/write command from the peripheral to the host for use with the memory.

The ATC is populated by a memory management unit in the host. Periodically, the host may determine that a particular address translation has aged out, expired, or is otherwise no longer to be used. The traditional technique through which use of the expired address was handled was through an invalidation command from the host to the peripheral. Up to thirty-two (32) such commands could be pending at one time. When the peripheral finished certain clean-up tasks associated with the invalidation command, the peripheral would acknowledge the invalidation. These acknowledgements imposed a signaling overhead on the communication between the peripheral and the host. Accordingly, there remains a need to improve the address translation invalidation process.

SUMMARY OF THE DISCLOSURE

Aspects disclosed in the detailed description include systems and methods for fast invalidation in Peripheral Component Interconnect (PCI) express (PCIe) address translation services (ATS). Exemplary aspects of the present disclosure initially utilize a fast invalidation request to alert endpoints that an address is being invalidated. Instead of requiring immediate action on the part of the endpoints, a host allows the endpoints to accumulate such invalidation requests until a fast invalidation synchronization command is sent from the host to the endpoints. On receipt of such a synchronization command, the endpoints flush through any residual read/write commands associated with any invalidated address and delete any associated address entries in an address translation cache (ATC). After these tasks are completed, each endpoint may send a synchronization complete acknowledgement to the host. Exemplary aspects of the present disclosure further provide a tag with a numerically incrementing identifier for each invalidation request. When a synchronization command is sent, the synchronization command includes a current value for the incrementing identifier. If an endpoint has not received requests having each of the tags between the last synchronized tag number and the tag in the synchronization command, the endpoint may take action to secure a missing invalidation request. Use of the fast invalidation commands, the synchronization commands, and the tags helps reduce overhead in the system as well as helps insure that invalidation commands are received and acted on so that the legacy address translations do not remain to clutter up the communication between the host and endpoints.

In this regard in one aspect, a method of communicating over a communication link is disclosed. The method includes inserting a tag including an incrementing identifier into each of a series of fast invalidation request messages relating to an address translation table. The method also includes detecting a missing or corrupted fast invalidation request message based on a missing incrementing identifier.

In another aspect, a communication system is disclosed. The communication system includes a communication link. The communication link also includes a root complex. The root complex includes a link interface configured to be coupled to the communication link. The root complex also includes a control system. The control system is configured insert a tag including an incrementing identifier into each of a series of fast invalidation request messages relating to an address translation table. The control system is also configured to send the series of fast invalidation request messages over the communication link. The communication system also includes an endpoint. The endpoint includes an endpoint link interface configured to be coupled to the communication link. The endpoint also includes an endpoint control system. The endpoint control system is configured to receive the series of fast invalidation request messages over the communication link. The endpoint control system is also configured to detect a missing or corrupted fast invalidation request message within the series of fast invalidation request messages based on a missing incrementing identifier.

In another aspect, an apparatus is disclosed. The apparatus includes a root complex. The root complex includes a link interface configured to be coupled to a communication link. The root complex also includes a control system. The control system is configured to insert a tag including an incrementing identifier into each of a series of fast invalidation request messages relating to an address translation table. The control system is also configured to send the series of fast invalidation request messages over the communication link.

In another aspect, an apparatus is disclosed. The apparatus includes an endpoint. The endpoint includes an endpoint link interface configured to be coupled to a communication link. The endpoint also includes an endpoint control system. The endpoint control system is configured to receive a series of fast invalidation request messages over the communication link. The endpoint control system is also configured to detect a missing or corrupted fast invalidation request message within the series of fast invalidation request messages based on a missing incrementing identifier.

In another aspect, a method for communicating over a communication link is disclosed. The method includes inserting a tag including an incrementing identifier into each of a series of fast invalidation request messages relating to an address translation table. The method also includes sending the series of fast invalidation request messages over the communication link.

In another aspect, a method for communicating over a communication link is disclosed. The method includes receiving a series of fast invalidation request messages over the communication link. The method also includes detecting a missing or corrupted fast invalidation request message within the series of fast invalidation request messages based on a missing incrementing identifier.

DETAILED DESCRIPTION

Figure 1:
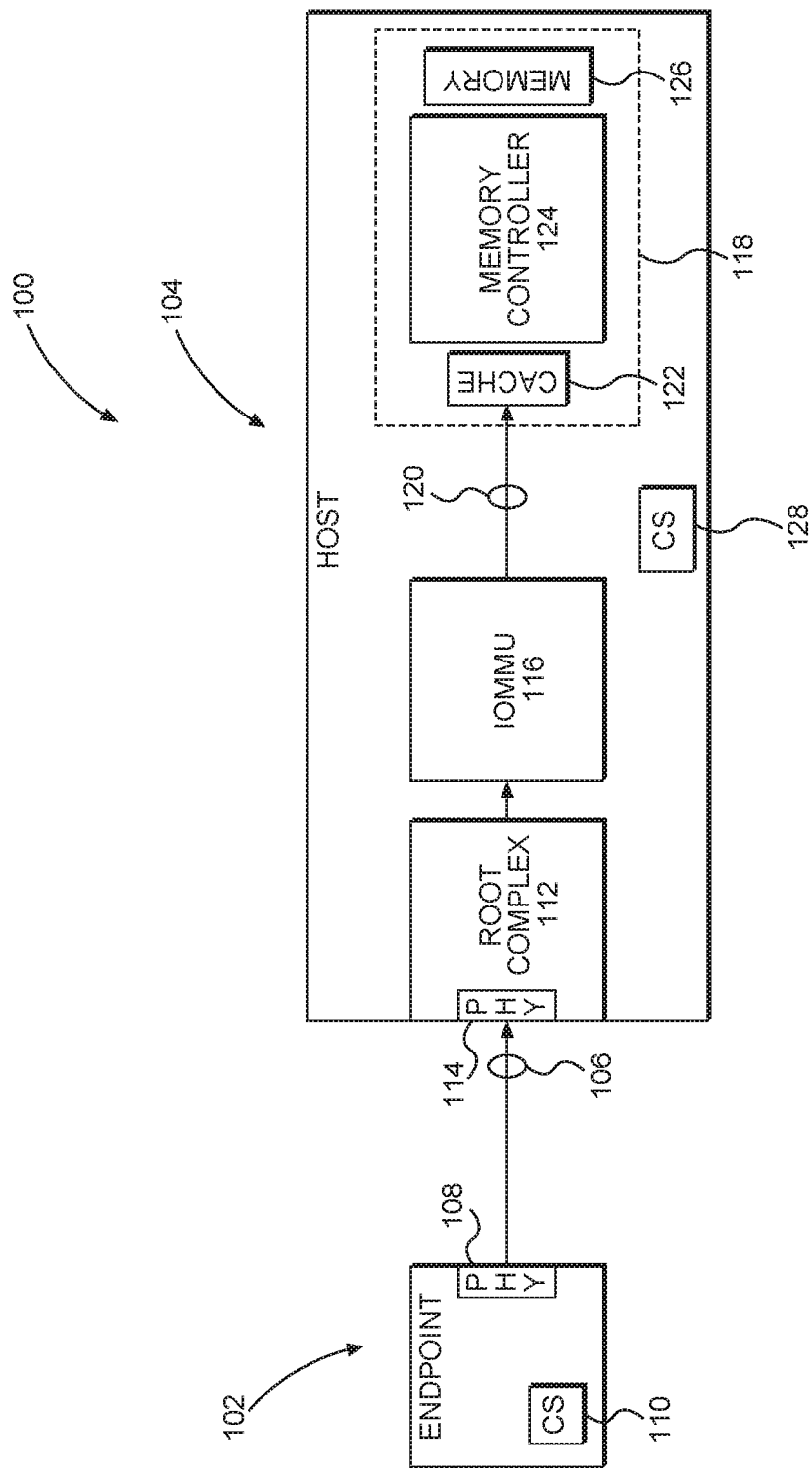
FIG. 1 is a block diagram of an exemplary computing device that uses physical addresses between an endpoint and a root complex of a Peripheral Component Interconnect (PCI) express (PCIe) link.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for fast invalidation in Peripheral Component Interconnect (PCI) express (PCIe) address translation services (ATS). Exemplary aspects of the present disclosure initially utilize a fast invalidation request to alert endpoints that an address is being invalidated. Instead of requiring immediate action on the part of the endpoints, a host allows the endpoints to accumulate such invalidation requests until a fast invalidation synchronization command is sent from the host to the endpoints. On receipt of such a synchronization command, the endpoints flush through any residual read/write commands associated with any invalidated address and delete any associated address entries in an address translation cache (ATC). After these tasks are completed, each endpoint may send a synchronization complete acknowledgement to the host. Exemplary aspects of the present disclosure further provide a tag with a numerically incrementing identifier for each invalidation request. When a synchronization command is sent, the synchronization command includes a current value for the incrementing identifier. If an endpoint has not received requests having each of the tags between the last synchronized tag number and the tag in the synchronization command, the endpoint may take action to secure a missing invalidation request. Use of the fast invalidation commands, the synchronization commands, and the tags helps reduce overhead in the system as well as helps insure that invalidation commands are received and acted on so that the legacy address translations do not remain to clutter up the communication between the host and endpoints.

Figure 2:
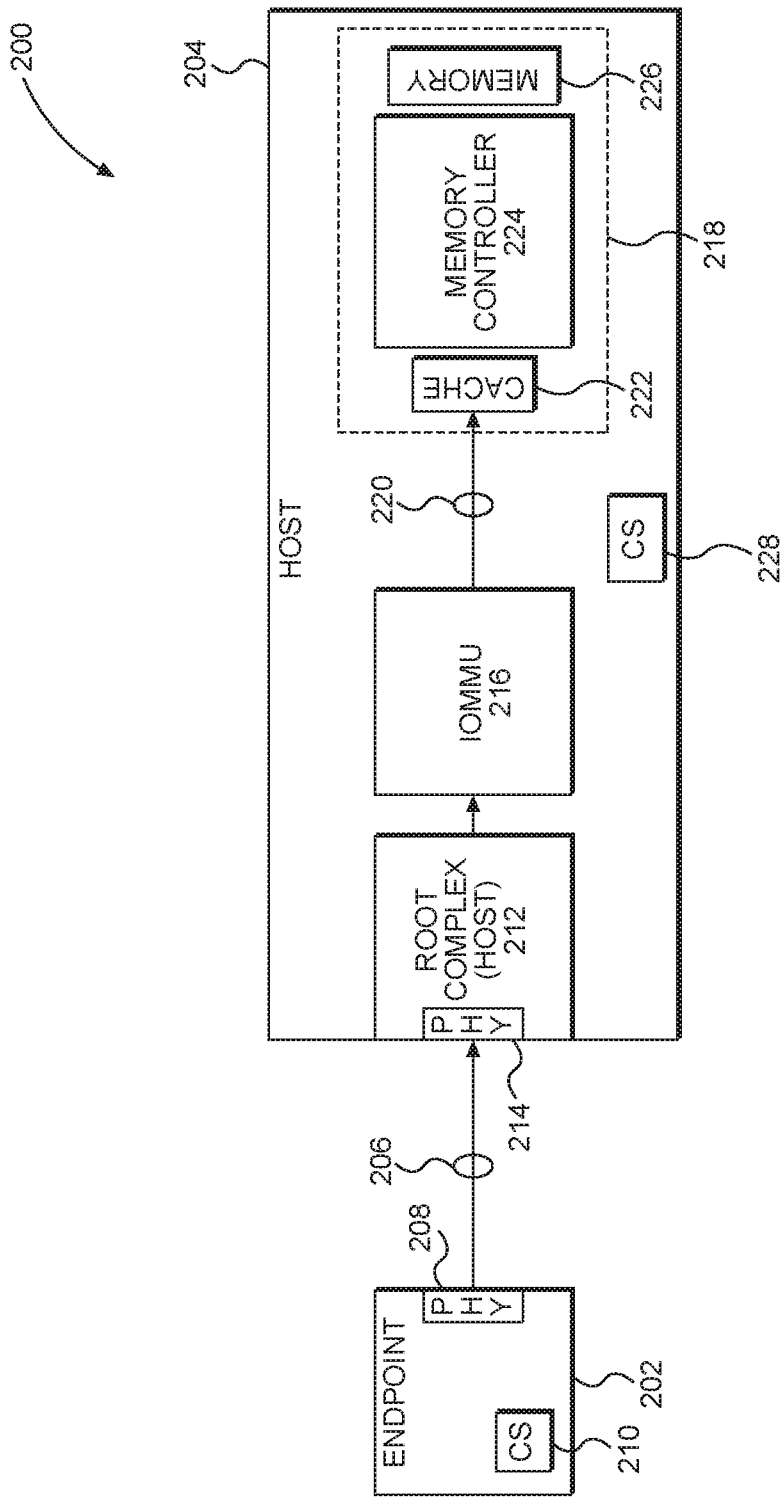
FIG. 2 is a block diagram of an exemplary computing device that uses virtual addresses between an endpoint and a root complex of a PCIe link.
Figure 3:
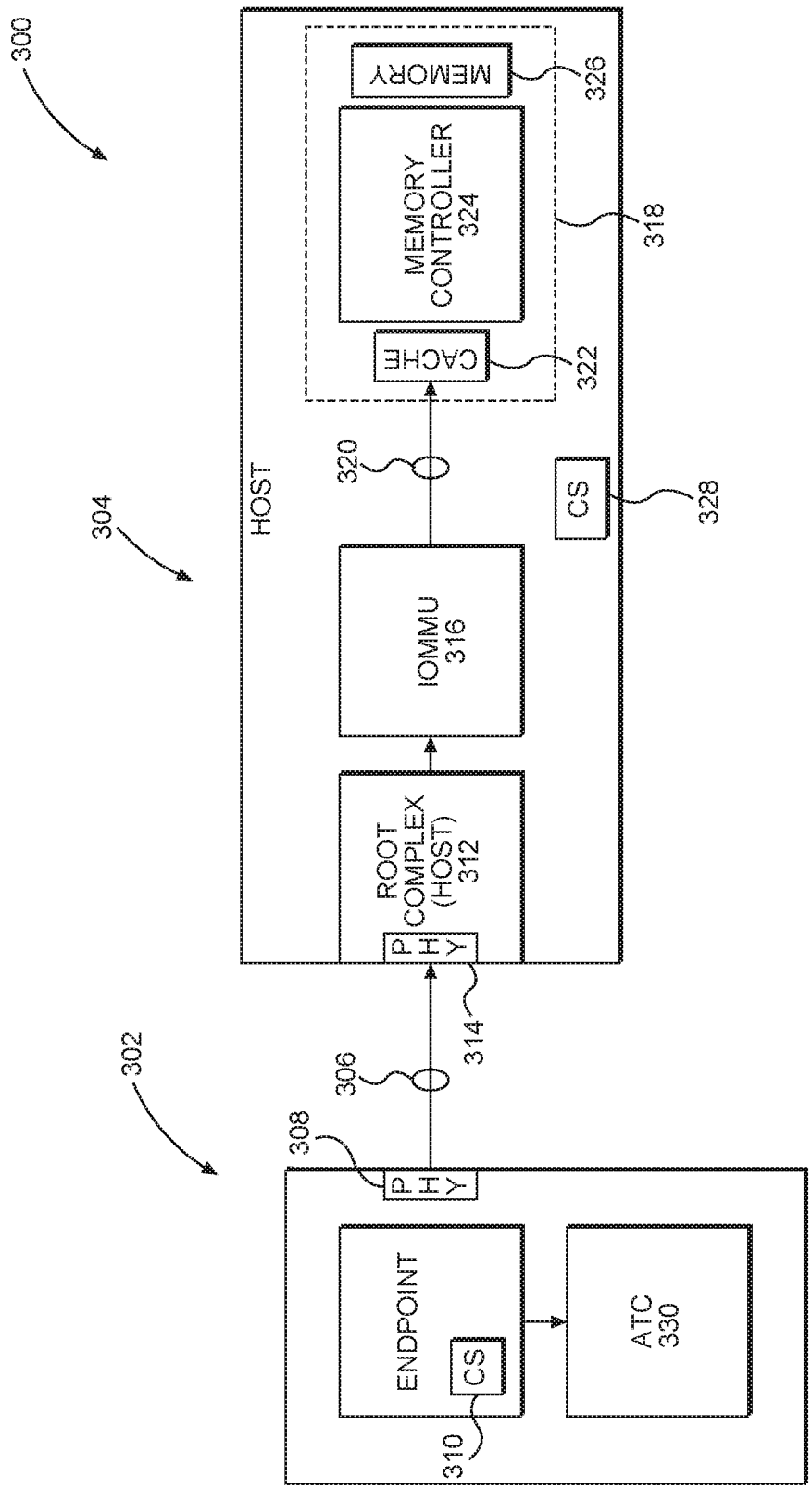
FIG. 3 is a block diagram of an exemplary computing device that uses physical addresses across a PCIe link, but has an address translation cache (ATC) in an endpoint so that portions of the endpoint use virtual addresses.

Before addressing particulars of the present disclosure, a brief discussion of ATS is provided in conventional PCIe systems with reference to FIGS. 1-3 followed by a discussion of a multi-endpoint PCIe system with reference to FIG.

4. Discussion of exemplary aspects of the present disclosure begins below with reference to FIG. 5.

In this regard, FIG. 1 is a block diagram of a computing device 100 having a first IC 102 coupled to a second IC 104 through a PCIe link 106. While the PCIe connections described herein (both for FIG. 1 and for the other Figures) may act as a bus, the nomenclature of the PCIe standard and the general point-to-point nature makes it more appropriate to refer to the connections as links. However, it should be appreciated that such a connection may also be referred to as a bus. The first IC 102 may be an endpoint as that term is used by the PCIe specification and may functionally correspond to a modem, an accelerator, or the like. The first IC 102 may include a link interface 108 which may correspond to a physical layer (PHY) configured to communicate over the PCIe link 106. The first IC 102 may further include a control system (referenced as CS in the drawings) 110.

With continued reference to FIG. 1, the second IC 104 may be a host as that term is used by the PCIe specification and may functionally be an application processor, a system on a chip (SoC), or the like. As part of being a host, the second IC 104 includes logic elements that form a root complex 112 which includes a PHY 114 configured to communicate over the PCIe link 106. The second IC 104 further includes an input/output memory management unit (IOMMU) 116 that communicates with a memory module 118 over an internal coherent bus 120. The memory module 118 may contain a cache memory 122, a memory controller 124, and a memory element 126. The second IC 104 may further include a control system 128 which may be a processing core or the like.

With continued reference to FIG. 1, in the original PCIe systems such as the computing device 100, the first IC 102 may initiate a read/write command to the memory element 126 through the PCIe link 106. To make sure that the appropriate portion of the memory element 126 was addressed, the first IC 102 would use a physical address corresponding directly to the address of the relevant portion of the memory element 126. As such, in the early systems there was no address translation.

As the size of the memory element 126 increased, and as the inconvenience of not being able to fragment use of the memory element 126 increased, the PCIe specification allowed virtual addresses to be used.

In this regard, FIG. 2 illustrates a computing device 200 that is similar to the computing device 100 of FIG. 1. The computing device 200 has a first IC 202 coupled to a second IC 204 through a PCIe link 206. The first IC 202 may be an endpoint as that term is used by the PCIe specification and may functionally correspond to a modem, an accelerator, or the like. The first IC 202 may include a link interface 208 which may correspond to a PHY configured to communicate over the PCIe link 206. The first IC 202 may further include a control system (referenced as CS in the drawings) 210.

With continued reference to FIG. 2, the second IC 204 may be a host as that term is used by the PCIe specification and may functionally be an application processor, a SoC, or the like. As part of being a host, the second IC 204 includes logic elements that form a root complex 212 which includes a link interface or PHY 214 configured to communicate over the PCIe link 206. The second IC 204 further includes an IOMMU 216 that communicates with a memory module 218 over an internal coherent bus 220. The memory module 218 may contain a cache memory 222, a memory controller 224, and a memory element 226. The second IC 204 may further include a control system 228 corresponding to a processing core or the like.

With continued reference to FIG. 2, the first IC 202 may initiate a read/write command to the memory element 226 through the PCIe link 206. However, in contrast to the computing device 100 of FIG. 1, the first IC 202 may use a virtual address when it addresses the memory element 226. The virtual address is assigned by the IOMMU 216, and the IOMMU 216 receives the read/write command with the virtual address. On receipt, the IOMMU 216 translates the virtual address to a physical address before sending the request with the physical address to the memory module 218 over the internal coherent bus 220. While this approach allows use of larger memory elements and allows for fragmentary memory use, this approach also creates a bottleneck at the IOMMU 216 as multiple endpoints may require address translation concurrently.

To alleviate the bottleneck at the IOMMU 216, further evolutions of PCIe moved the address translation to an ATC in the endpoint. This arrangement is illustrated in FIG. 3. In this regard, FIG. 3 illustrates a computing device 300 that is similar to the computing devices 100 and 200 of FIGS. 1 and 2. Specifically, the computing device 300 has a first IC 302 coupled to a second IC 304 through a PCIe link 306. The first IC 302 may be an endpoint as that term is used by the PCIe specification and may functionally correspond to a modem, an accelerator, or the like. The first IC 302 may include a link interface 308 which may correspond to a PHY configured to communicate over the PCIe link 306. The first IC 302 may further include a control system (referenced as CS in the drawings) 310.

With continued reference to FIG. 3, the second IC 304 may be a host as that term is used by the PCIe specification and may functionally be an application processor, a SoC, or the like. As part of being a host, the second IC 304 includes logic elements that form a root complex 312 which includes a link interface or PHY 314 configured to communicate over the PCIe link 306. The second IC 304 further includes an IOMMU 316 that communicates with a memory module 318 over an internal coherent bus 320. The memory module 318 may contain a cache memory 322, a memory controller 324, and a memory element 326. The second IC 304 may include a control system 328 which may be a processing core or the like.

In contrast to the computing device 100 of FIG. 1 or the computing device 200 of FIG. 2, the first IC 302 of the computing device 300 includes an ATC 330, which may include necessary and sufficient memory elements to store a look-up table or the like to hold address translations. In particular, when the first IC 302 has an initial memory access request (i.e., a read or write), the first IC 302 communicates with the IOMMU 316 through a translation request. The IOMMU 316 assigns a physical address to virtual address translation and communicates this translation to the first IC 302 for storage in the ATC 330. Then when the first IC 302 has a memory access request, the first IC 302 initially uses the virtual address, but sends it to the ATC 330. The ATC 330 translates the virtual address to the physical address provided by the IOMMU 316 and the first IC 302 sends the memory access request with the physical address to the second IC 304. On receipt, the IOMMU 316 sends the request with the physical address to the memory module 318 over the internal coherent bus 320.

After some period of non-use or expiration of a predefined amount of time or other event, the IOMMU 316 or translation agent within the IOMMU 316 may determine that the initially provided virtual address to physical address mapping has expired. Accordingly, the IOMMU 316 causes the root complex 312 to send an invalidation request message to the first IC 302. In traditional PCIe systems, receipt of an invalidation request message caused the first IC 302 to delete the entry in the ATC 330, making sure that all pending non-posted transactions that use the invalidated address are completed, and flush all pending posted transactions which utilized the invalidated address. On completion of these activities, the first IC 302 would send an invalidation completion message to the second IC 304. The invalidation completion message may be sent on each traffic class for which the invalidated address was used. The root complex 312 then collects all invalidation completion messages for each traffic class, waits for all previous posted and non-posted transactions using the invalidated address to complete, and indicates to software that the invalidation completion messages were received and executed. Up to thirty-two (32) invalidation request messages may be active and pending at any given time. The sending and receiving of the invalidation request and the invalidation completion messages imposes a signaling overhead penalty on the PCIe link 306.

Figure 4:
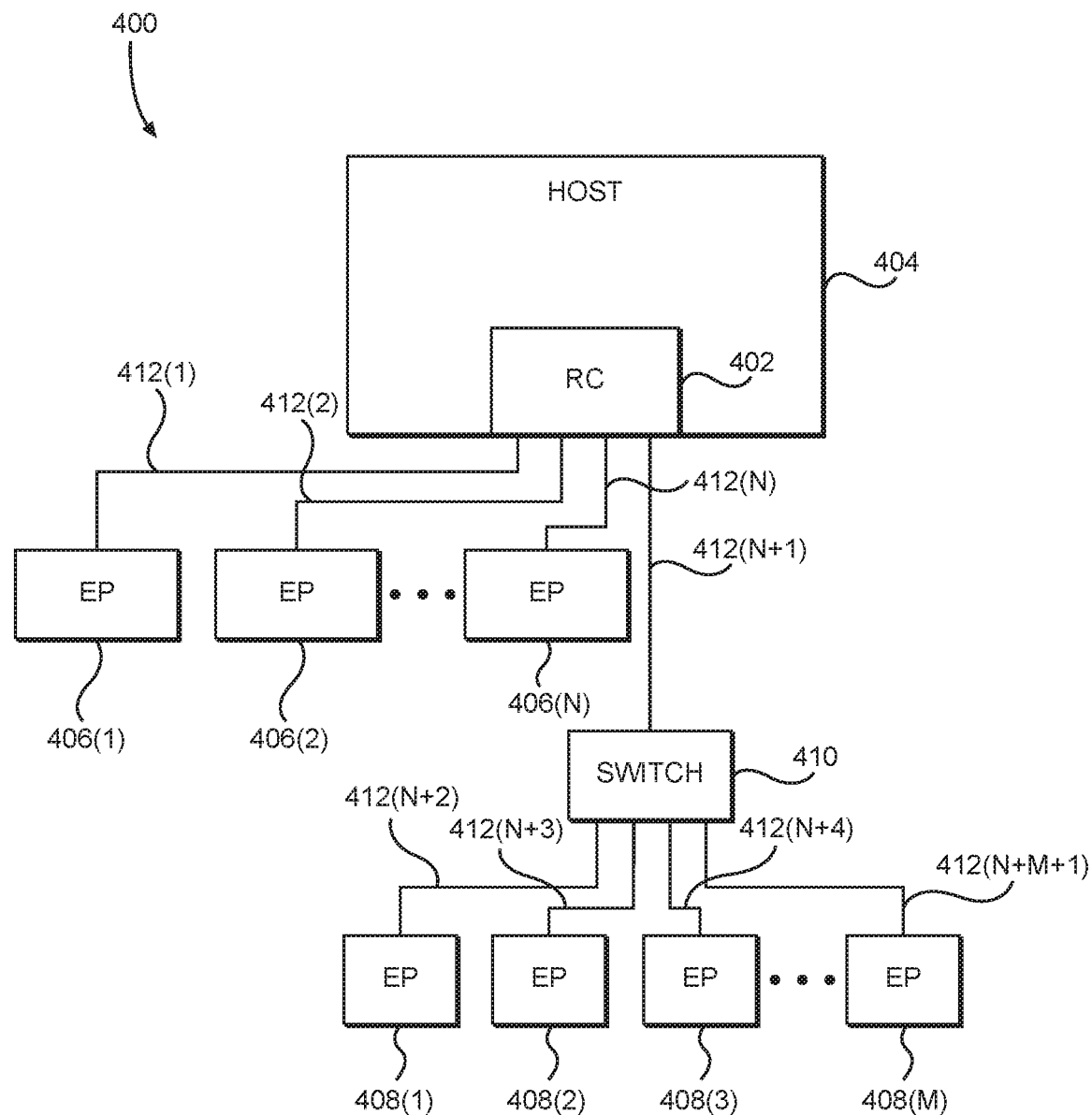
FIG. 4 is a block diagram of an exemplary computing device that includes a root complex connected to a plurality of endpoints directly and through a switch.

FIG. 4 provides an exemplary PCIe system 400 where a root complex 402 in a host 404 may communicate to multiple endpoints 406(1)-406(N) directly and to additional endpoints 408(1)-408(M) through a switch 410. Each connection between respective elements is a high-speed serial point-to-point PCIe link 412(1)-412(M+N+1).

Recent proposals contemplate a fast invalidation request. As before, software in the root complex 312 of FIG. 3 may determine that it is appropriate to invalidate an earlier translation entry. The root complex 312 sends a fast invalidation request message to the first IC 302. When the first IC 302 receives the fast invalidation request message, the first IC 302 performs several action, including: invalidate the entry in the ATC 330 and cease using the invalidated address; continue processing all pending non-posted transactions using the invalidated address to completion; and flush all pending posted transactions using the invalidated address. However, the first IC 302 does not need to send an invalidation completion message.

Under the fast invalidation proposal, when the software in the root complex 312 wants to flush all previous fast invalidation request messages, the root complex 312 sends a fast invalidation synchronization message to the first IC 302. The first IC 302 completes the tasks that were initiated by receipt of the fast invalidation request and also waits for all current non-posted transactions utilizing invalidated addresses to complete (if they have not already completed). When the last transaction completes, the first IC 302 sends a fast invalidation synchronization completion message to the root complex 312. The root complex 312 waits for all previous posted and non-posted transactions to complete or flush before notifying the software that the fast invalidation synchronization completion message was received and executed.

Current proposals assume that the endpoints will receive all fast invalidation requests, and thus, when the endpoints respond to the fast invalidation synchronization message, the root complex assumes that all fast invalidation messages have been processed when the endpoint sends a fast invalidation synchronization complete message. However, if an endpoint did not receive a fast invalidation request message, then it will not perform the clean-up tasks for one or more invalidated addresses corresponding to the messages not received and the endpoint will continue to have transactions that use the invalidated address.

Exemplary aspects of the present disclosure introduce a tag that has an incrementing identifier that helps identify corrupted or missing fast invalidation request messages. When the endpoint detects a missing tag, the endpoint may take remedial action.

Figure 5:
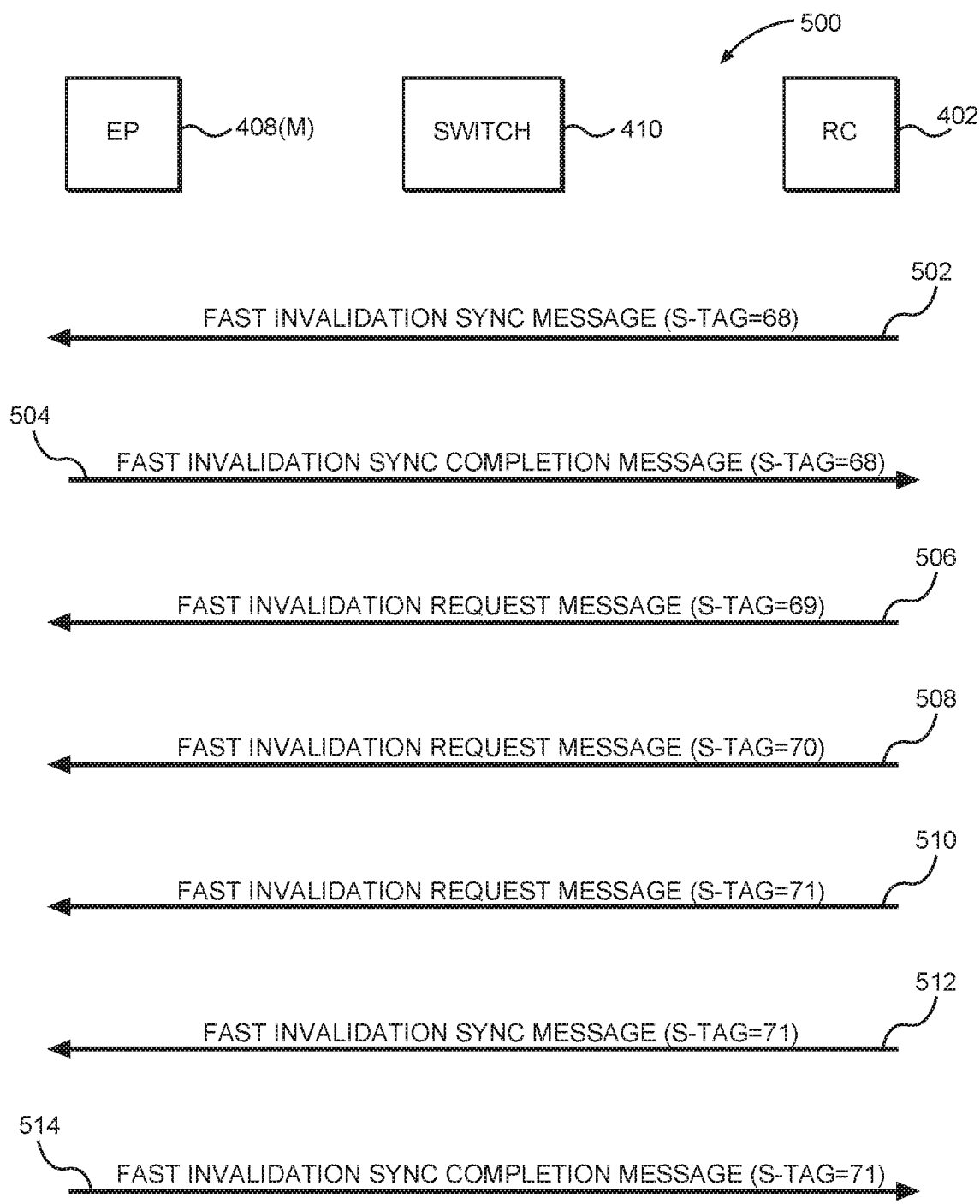
FIG. 5 is a simplified signal flow diagram of fast invalidation request messages with fast invalidation synchronization messages, all having tags with an incrementing identifier therein for missing message detection.

FIG. 5 is a simplified signal flow diagram 500 of fast invalidation request messages between the root complex 402 of FIG. 4 and an endpoint such as endpoint 408(M) through the switch 410 with fast invalidation synchronization (sync) messages, all having tags with incrementing identifiers (sometimes referred to as incremental tags) therein for missing message detection. FIG. 5 assumes a system where there are no lost or corrupted signals between the root complex 402 and the endpoint 408(M). Thus, the root complex 402 sends a fast invalidation synchronization message 502 having a tag with an incrementing identifier (e.g., S-Tag=68). This causes the endpoint 408(M) to complete all its clean-up tasks (e.g., clearing the ATC, pushing all non-published and published tasks to the root complex, and the like) for any previously received invalidation request messages. On completion of the clean-up tasks for all outstanding fast invalidation request messages since the last synchronization (or if there has been no previous synchronization, then from S-Tag=1), the endpoint 408(M) sends a fast invalidation synchronization completion message 504 using the same incrementing identifier as was used in the synchronization message 502 (i.e., S-Tag=68). Subsequently, the root complex 402 sends an additional fast invalidation request message 506 with a tag having an incremented identifier (e.g., S-Tag=69), a fast invalidation request message 508 with an incremented identifier (e.g., S-Tag=70), and a fast invalidation request message 510 with an incremented identifier (e.g., S-Tag=71). The root complex 402 then sends a fast invalidation synchronization message 512 using the last identifier (e.g., S-Tag=71). In the signal flow 500 all the invalidation request messages are received at the endpoint 408(M), and the endpoint 408(M) sends a fast invalidation synchronization completion message 514 with an identifier corresponding to the synchronization message (e.g., S-Tag=71). Note that these identifiers are in tags in the messages.

In exemplary aspects of the present disclosure, the endpoint 408(M) may store identifiers from the tags in registers, set a flag that they have been received, increment a counter, or otherwise determine that a given S-Tag has been received.

Figure 6:
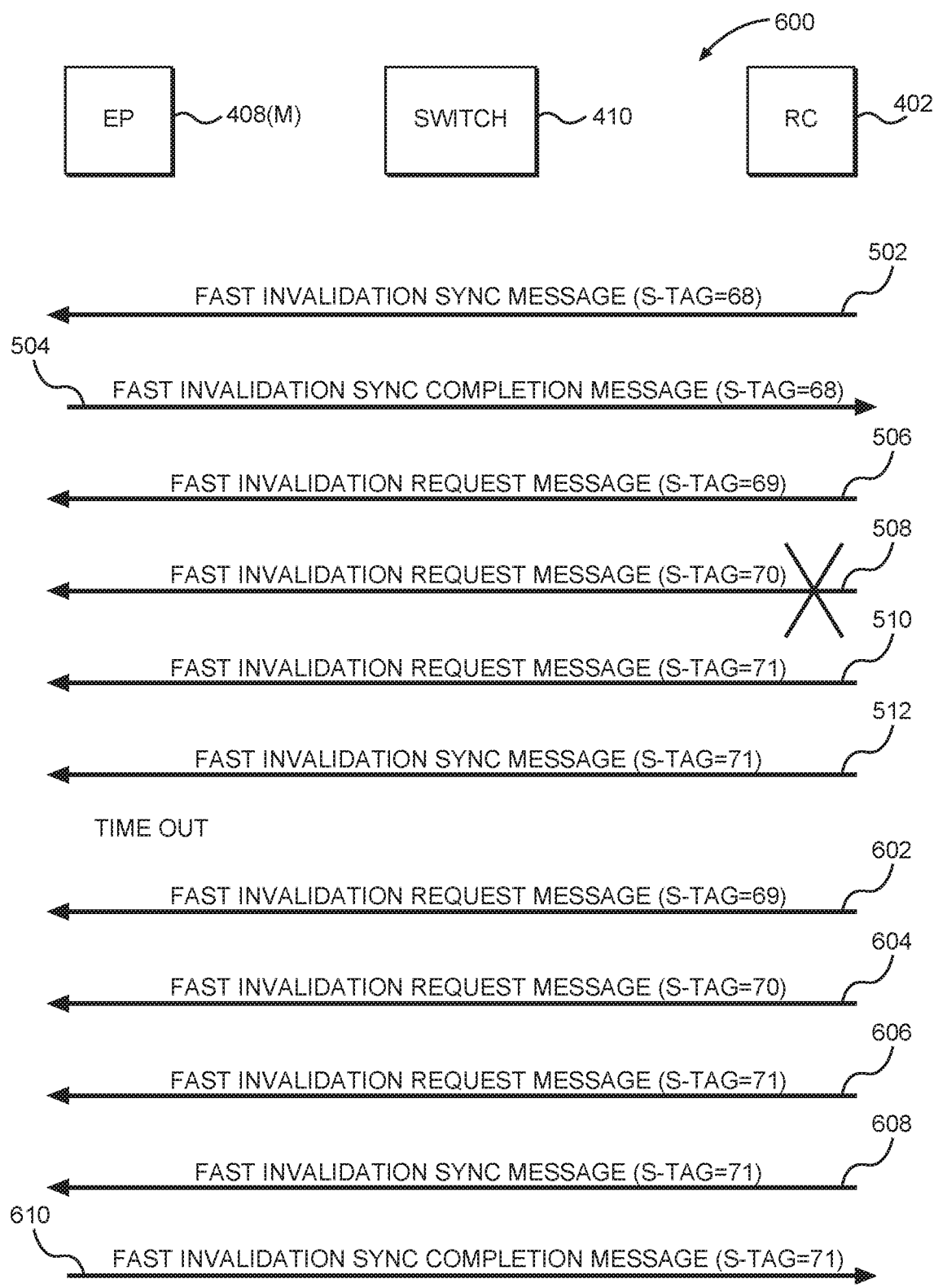
FIG. 6 is a simplified signal flow diagram of fast invalidation messages where one of the fast invalidation messages is lost or corrupted before arriving at an endpoint, thereby precluding a fast invalidation synchronization message from the endpoint and triggering resending of all intervening fast invalidation request messages.

While the signal flow 500 assumes that all invalidation request messages were received, exemplary aspects of the present disclosure provide a mechanism for the endpoint 408(M) to indicate to the root complex 402 that not all of the invalidation requests were received. In this regard, FIG. 6 is a simplified signal flow 600 of fast invalidation messages where one of the fast invalidation messages is lost or corrupted before arriving at an endpoint, thereby precluding a fast invalidation synchronization message from the endpoint and triggering resending of all intervening fast invalidation request messages. The signal flow 600 begins much like the signal flow 500 of FIG. 5 with the messages 502, 504, 506, 508, 510, and 512 sent by the root complex 402. However, the request message 508 is not received by the endpoint 408(M). Thus, when the synchronization message 512 is sent, the endpoint 408(M) determines that not every message was received. For example, a register may show that only two requests were received but the incremented identifier shows that three messages were sent. A comparison of identifiers to flags in a register may be made. Regardless of how the determination is made, the endpoint 408(M) does not send a synchronization completion message (e.g., the synchronization completion message 514 of the signal flow 500). After a predetermined amount of time without having received the synchronization completion message, the root complex 402 resends the fast invalidation request messages with incrementing identifiers in tags in the form of messages 602, 604, and 606 along with another synchronization message 608. For the sake of example, the messages 602, 604, and 606 were received by the endpoint 408(M), and the endpoint 408(M) sends a synchronization completion message 610 with an identifier corresponding to the last incremented identifier (S-Tag=71). If one or more of the messages 602, 604, and 606 were not received, another time out would occur.

Figure 7:
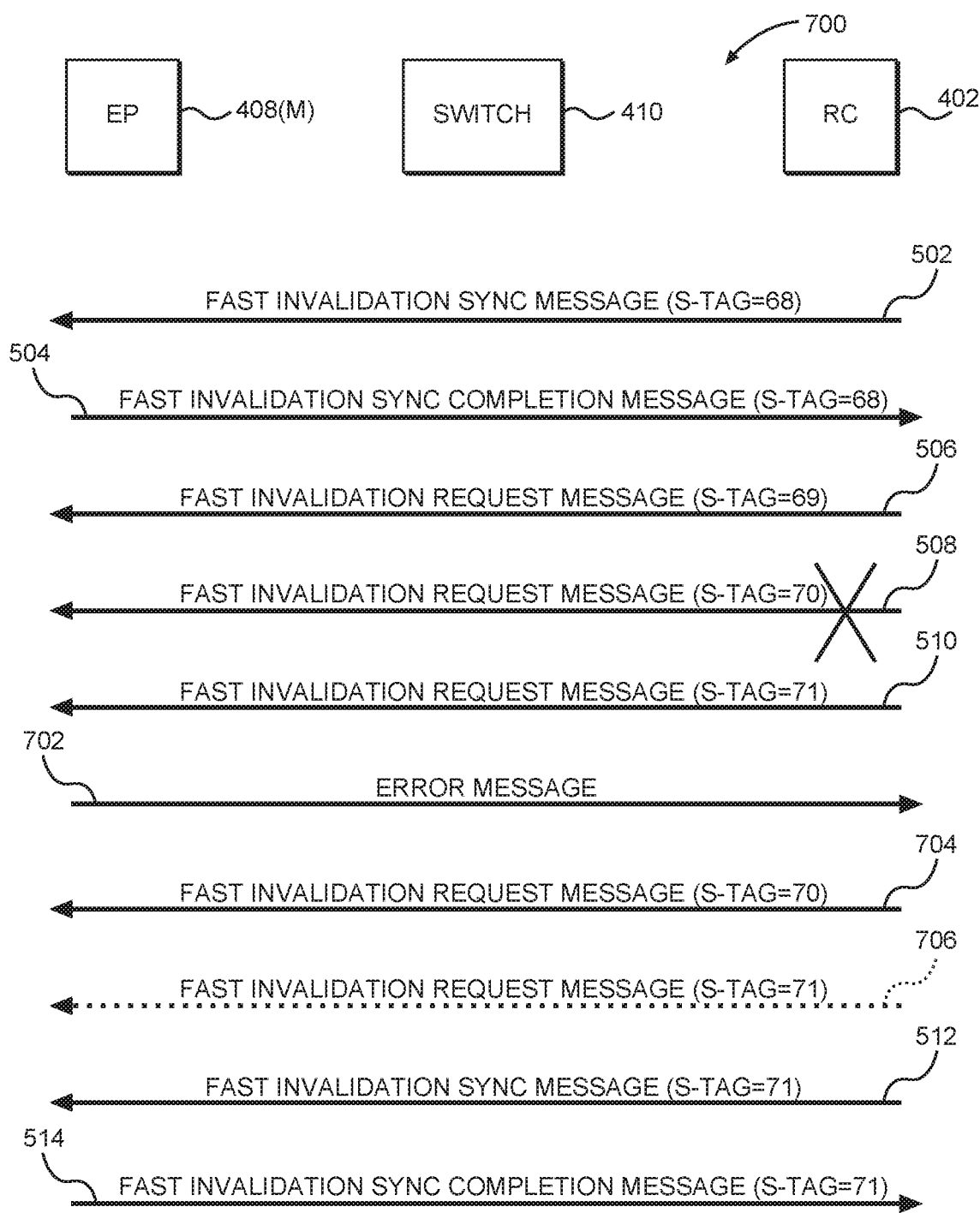
FIG. 7 is a simplified signal flow diagram of fast invalidation messages where one of the fast invalidation messages is lost or corrupted before arriving at an endpoint causing the endpoint to signal loss of the message to the root complex.

The signal flow 600 where every fast invalidation request message is resent imposes a signaling penalty on the computing device. Additionally, the period spent waiting for a time out after sending the synchronization message 512 slows operation. Accordingly, an alternate exemplary aspect of the present disclosure sends an alert on detection of the missing invalidation request message. In this regard, FIG. 7 is a simplified signal flow 700 of fast invalidation messages where one of the fast invalidation messages is lost or corrupted before arriving at an endpoint 408(M) causing the endpoint 408(M) to signal loss of the message to the root complex 402. The signal flow 700 begins identically to the signal flow 500 of FIG. 5 with the messages 502, 504, 506, 508 and 510. However, as with the signal flow 600 of FIG. 6, the message 508 is lost or corrupted before reaching the endpoint 408(M). On receipt of the message 510 with the incremented identifier in a tag more than one higher than the last identifier received (e.g., S-Tag=71 in the message 510 reflects the missing S-Tag 70 from the message 508), the endpoint 408(M) generates and sends an error message 702 to the root complex 402. In an exemplary aspect, the error message 702 indicates which message was missing through use of the identifier in a tag. In response to receiving the error message 702, the root complex 402 resends at least the missing fast invalidation request message 704 with the known missing identifier (S-Tag=70), and may optionally resend the fast invalidation request message 706 (S-Tag=71). The root complex 402 then sends the fast invalidation synchronization message (S-Tag=71) 512, and the endpoint 408(M), having now received all the invalidation request messages, sends the synchronization completion message 514.

Figure 8:
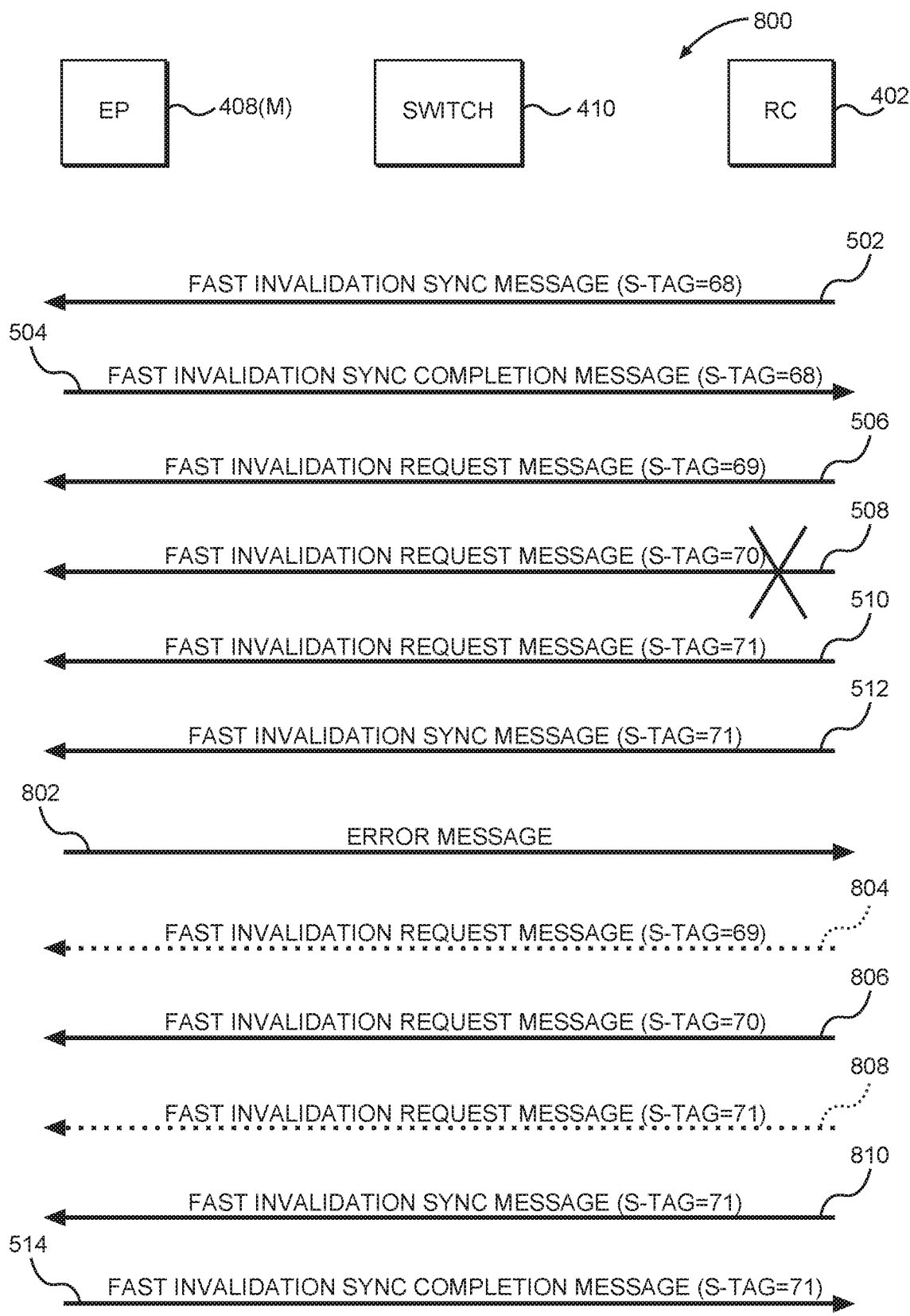
FIG. 8 is a simplified signal flow diagram of fast invalidation messages where one of the fast invalidation messages is lost or corrupted before arriving at an endpoint causing the endpoint to signal that it is missing a specific message after receipt of a fast invalidation synchronization message from the root complex.

As an alternative to the signal flow 700, the endpoint 408(M) may wait until the synchronization message 512 before sending the error message. This approach is similar to the signal flow 600 of FIG. 6, but does not wait for a time out to resend messages. In this regard, FIG. 8 is a simplified signal flow 800 of fast invalidation messages where one of the fast invalidation messages is lost or corrupted before arriving at an endpoint causing the endpoint to signal that it is missing a specific message after receipt of a fast invalidation synchronization message from the root complex. The signal flow 800 begins like the signal flow 500, with the messages 502, 504, 506, 508, 510, and 512. However, for example, the message 508 is not received by the endpoint 408(M). On receipt of the synchronization message 512, the endpoint 408(M) sends an error message 802. The error message 802 may indicate which identifiers have not been received since the last synchronization message 502. The root complex 402 then, depending on what information was in the error message 802, may resend the fast invalidation requests for all the requests since the last successful synchronization as messages 804, 806, and 808. Alternatively, if the error message 802 indicates with sufficient precision which requests have not been received then only that request (e.g., the message 806) is resent. Or, as another option, the missing message and all subsequent messages are resent (e.g., messages 806 and 808). Another synchronization message 810 is sent and the endpoint 408(M) now sends the synchronization completion message 514.

Figure 9:
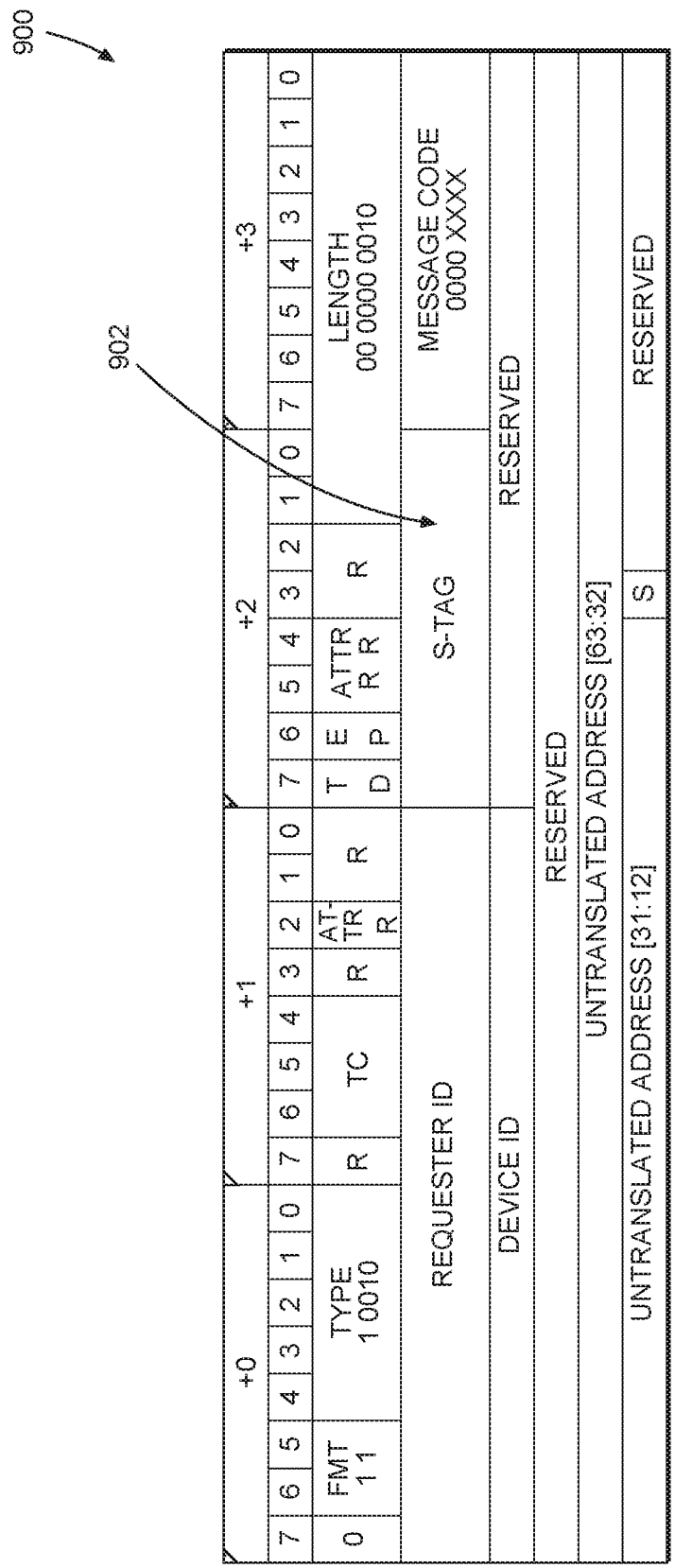
FIG. 9 is an exemplary PCIe invalidation related message with the tag having an incremental identifier included therein.

While there are numerous ways that the tag having the incrementing identifier can be implemented, an exemplary PCIe frame having an incremental identifier therein is provided with reference to FIG. 9. In particular, FIG. 9 illustrates a PCIe packet 900 with a field 902 into which the identifier forming the tag of the present disclosure may be placed. Note that while the field 902 is considered appropriate for insertion of the identifier, other locations could be used without departing from the scope of the present disclosure.

Figure 10A:
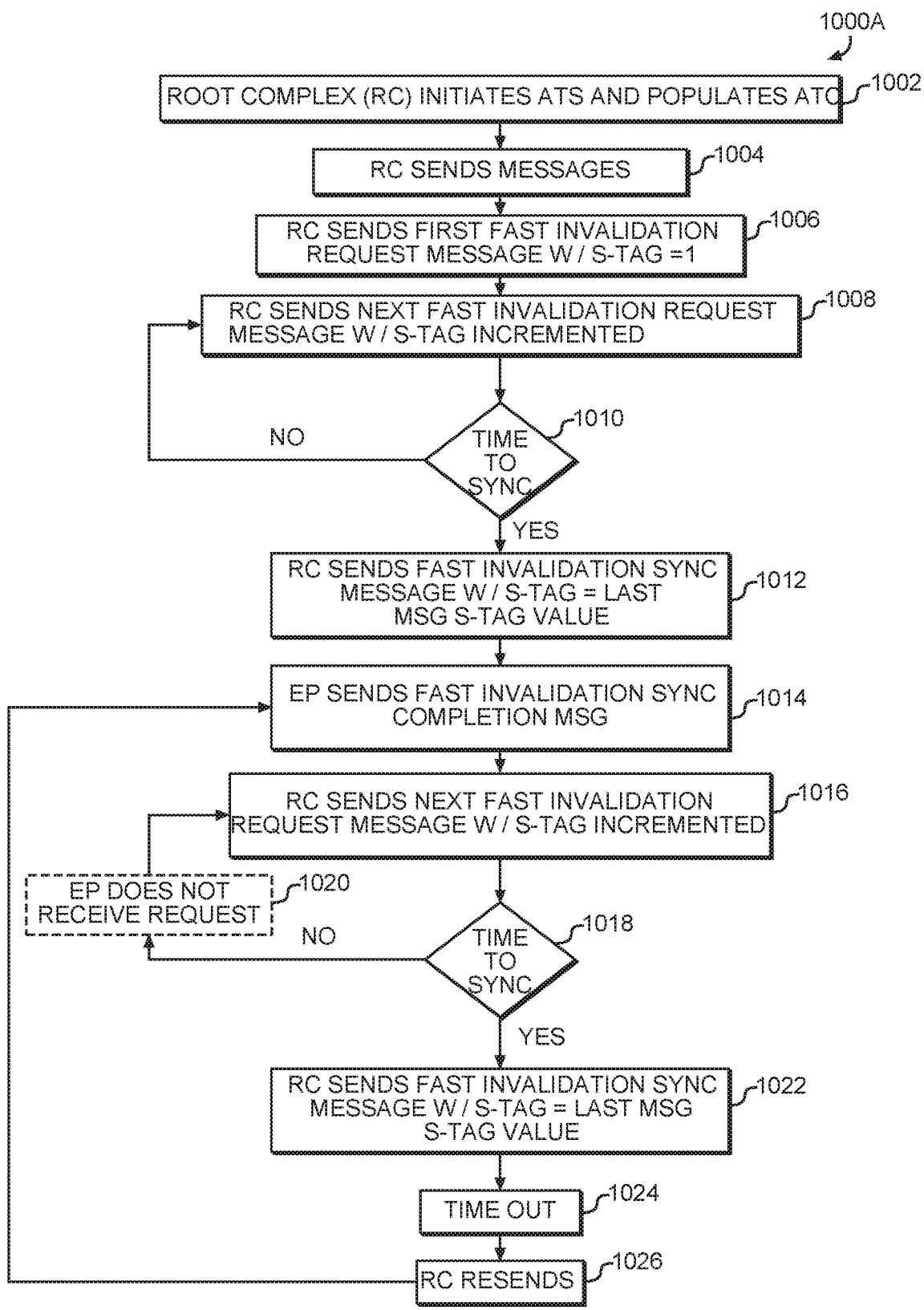
FIGS. 10A-10C are flowcharts illustrating exemplary processes corresponding to the signal flows of FIGS. 6-8, respectively.
Figure 10B:
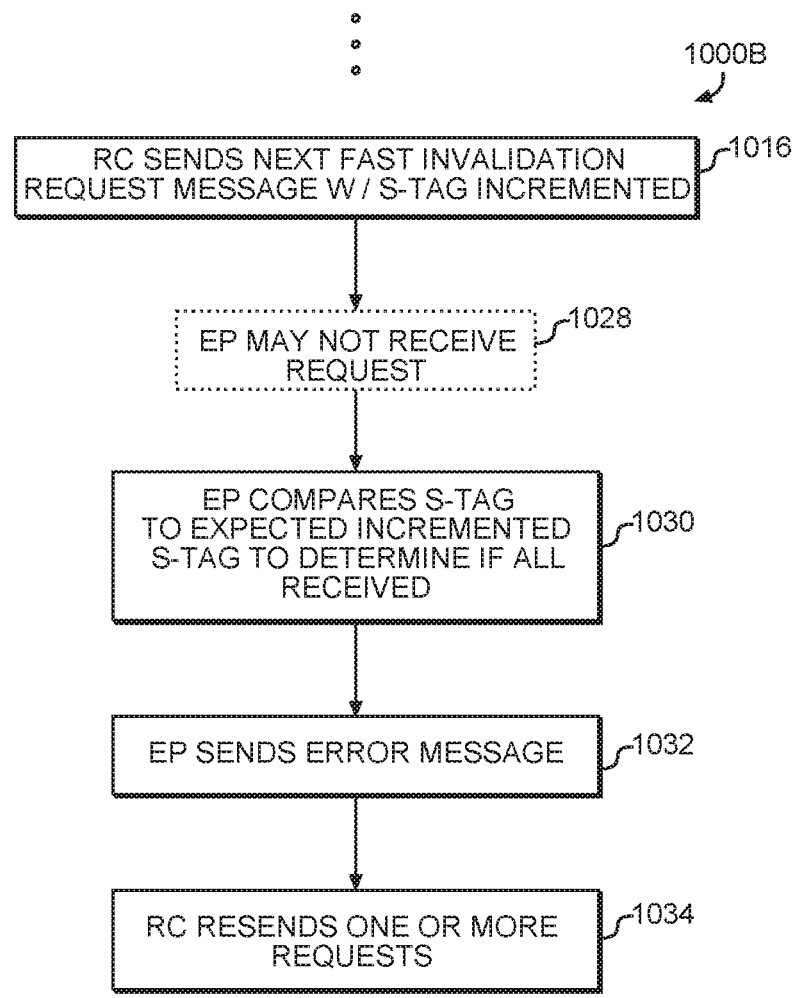
Figure 10C:
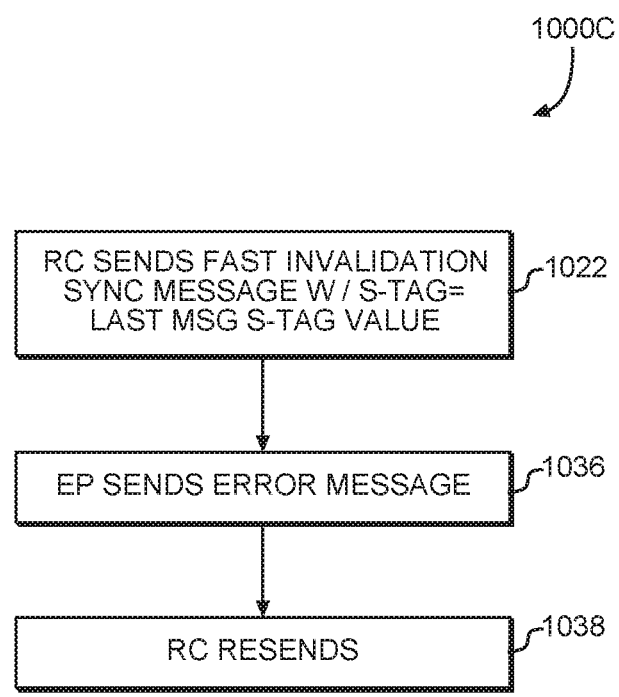

FIGS. 10A-10C provide flowcharts corresponding to the signal flows of FIGS. 6-8, respectively. In this regard, FIG. 10A illustrates a process 1000A where the RC initiates ATS and populates the ATC (block 1002). The RC sends messages to one or more EPs (block 1004). The RC sends a first fast invalidation request message with S-Tag=1 (block 1006). The RC then sends a next fast invalidation request message with the S-Tag (i.e., the incrementable identifier) incremented (block 1008). The RC determines whether it is time to synchronize (block 1010). As long as the answer is no, the RC will continue to send next fast invalidation request messages, each with an incremented S-Tag.

With continued reference to FIG. 10A, once block 1010 is answered yes, then the RC sends a fast invalidation sync message with an S-Tag equal to the last message S-Tag value (block 1012) (message 502). The EP completes clean up and sends the fast invalidation synchronization completion message with an S-Tag equal to the S-Tag of the synchronization message (block 1014) (message 504). The RC sends a next fast invalidation request message with the S-Tag incremented (block 1016) (messages 506, 508, and 510), while checking to see if it is time to synchronize (block 1018). If the answer is no at block 1018, it is possible that the EP does not receive one or more of the request messages (block 1020). However, the RC still sends more fast invalidation request messages. Once block 1018 is answered affirmatively, the RC sends the fast invalidation sync message with an S-Tag equal to the last message S-Tag value (block 1022) (message 512). The EP does not respond and a time out occurs (block 1024). After the RC detects the time out, the RC resends the messages (block 1026).

The process 1000B of FIG. 10B starts similarly up through block 1016 after which the endpoint may not receive a request (block 1028). The endpoint compares the received S-Tag to the expected incremented S-Tag to determine if the requests have been received or if there is a discontinuity in the S-Tags (block 1030). When there is a discontinuity, the EP sends an error message (block 1032) that indicates that one or more requests have not been received. The root complex then resends one or more requests (block 1034). As noted above, depending on the details of the error message and whether the root complex has sent further requests (and whether the endpoint can store requests received out of order), the number of resent requests may vary.

Similarly, the process 1000C of FIG. 10C operates similar to the process 1000A of FIG. 10A until block 1022 after which time, the endpoint sends an error message (block 1036). Depending on the details of the error message, the root complex resends the appropriate messages (block 1038).

The fast invalidation in PCIe ATS according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 11:
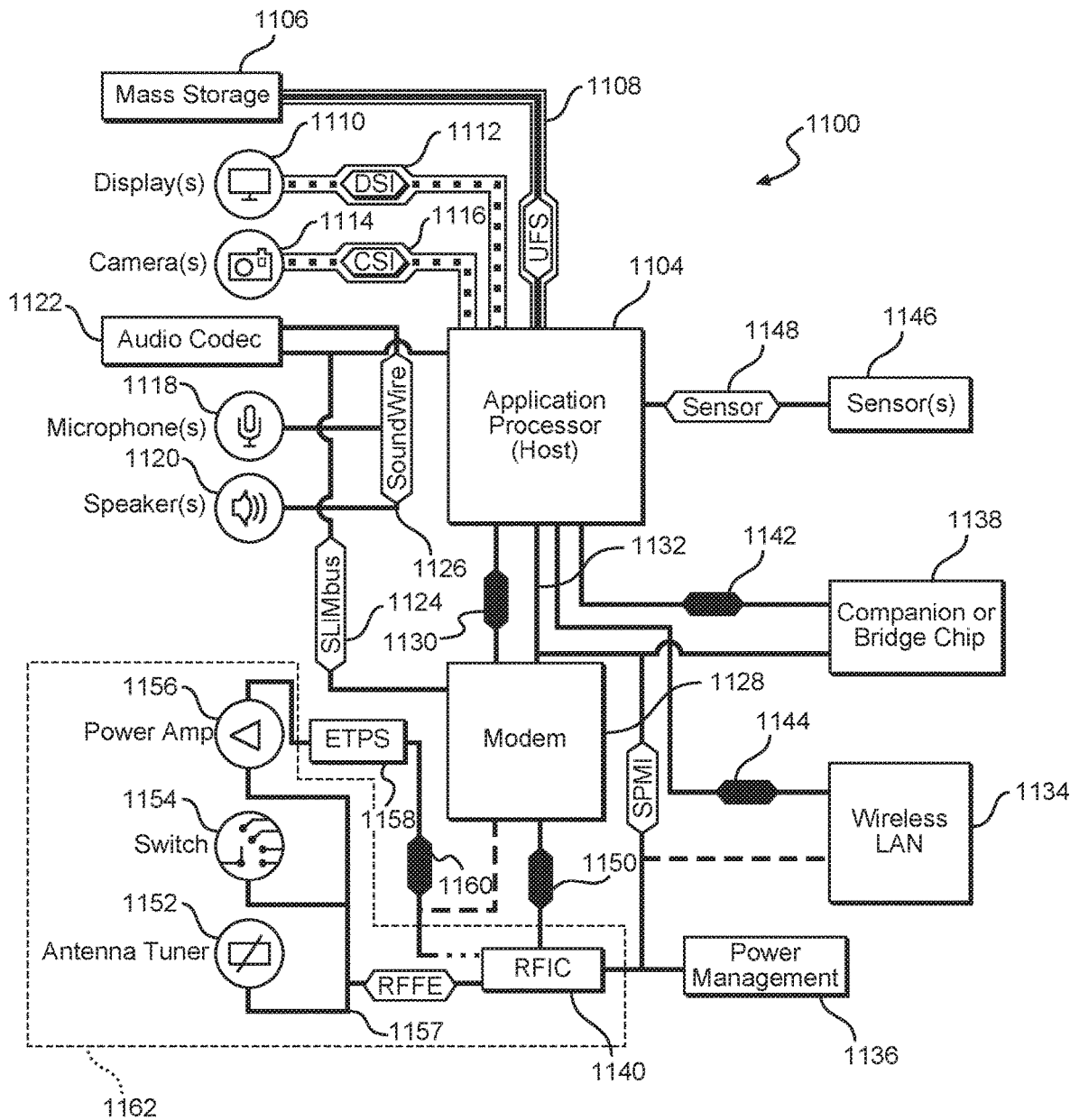
FIG. 11 is a block diagram of an exemplary processor-based system that can include the PCIe links and elements that may use the fast invalidation synchronization techniques of FIGS. 6-8.

In this regard, FIG. 11 is system-level block diagram of an exemplary mobile terminal 1100 such as a smart phone, mobile computing device tablet, or the like. While a mobile terminal is particularly contemplated as being capable of benefiting from exemplary aspects of the present disclosure, it should be appreciated that the present disclosure is not so limited and may be useful in any system having a PCIe link.

With continued reference to FIG. 11, the mobile terminal 1100 includes an application processor 1104 (sometimes referred to as a host) that communicates with a mass storage element 1106 through a universal flash storage (UFS) bus 1108. The application processor 1104 may further be connected to a display 1110 through a display serial interface (DSI) bus 1112 and a camera 1114 through a camera serial interface (CSI) bus 1116. Various audio elements such as a microphone 1118, a speaker 1120, and an audio codec 1122 may be coupled to the application processor 1104 through a serial low power interchip multimedia bus (SLIMbus) 1124. Additionally, the audio elements may communicate with each other through a SOUNDWIRE NEXT bus 1126. A modem 1128 may also be coupled to the SLIMbus 1124. The modem 1128 may further be connected to the application processor 1104 through a peripheral component interconnect (PCI) or PCI express (PCIe) bus 1130 and/or a system power management interface (SPMI) bus 1132. The PCIe bus 1130 may benefit from the exemplary aspects of the present disclosure provided above.

With continued reference to FIG. 11, the SPMI bus 1132 may also be coupled to a local area network (LAN) integrated circuit (IC) (LAN IC) 1134, a power management integrated circuit (PMIC) 1136, a companion integrated circuit (sometimes referred to as a bridge chip) 1138, and a radio frequency integrated circuit (RFIC) 1140. It should be appreciated that separate PCI buses 1142 and 1144 may also couple the application processor 1104 to the companion integrated circuit 1138 and the LAN IC 1134. The application processor 1104 may further be connected to sensors 1146 through a sensor bus 1148. The modem 1128 and the RFIC 1140 may communicate using a bus 1150.

With continued reference to FIG. 11, the RFIC 1140 may couple to one or more radio frequency front end (RFFE) elements, such as an antenna tuner 1152, a switch 1154, and a power amplifier 1156 through an RFFE bus 1157. Additionally, the RFIC 1140 may couple to an envelope tracking power supply (ETPS) 1158 through a bus 1160, and the ETPS 1158 may communicate with the power amplifier 1156. Collectively, the RFFE elements, including the RFIC 1140, may be considered an RFFE system 1162. It should be appreciated that the RFFE bus 1157 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component. IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A method of communicating over a communication link, comprising:
   inserting a tag comprising an incrementing identifier into each of a series of fast invalidation request messages relating to an address translation table; and
   detecting a missing or corrupted fast invalidation request message based on a missing incrementing identifier.

2. The method of claim 1, further comprising sending an error message to a host on detection of the missing or corrupted fast invalidation request message.

3. The method of claim 1, further comprising sending an error message after receipt of a fast invalidation synchronization message.

4. The method of claim 1, further comprising receiving resent fast invalidation request messages after a time out period.

5. The method of claim 1, wherein inserting the tag comprises inserting the tag at a root complex associated with a Peripheral Component Interconnect (PCI) express (PCIe) link.

6. The method of claim 1, wherein detecting the missing or corrupted fast invalidation request message comprises detecting at an endpoint associated with a Peripheral Component Interconnect (PCI) express (PCIe) link.

7. The method of claim 1, further comprising storing incrementing identifiers in registers at an endpoint.

8. The method of claim 1, further comprising sending at least one of the series of fast invalidation request messages with a respective tag from a root complex to an endpoint over the communication link.

9. The method of claim 8, further comprising receiving the at least one of the series of fast invalidation request messages at the endpoint.

10. The method of claim 8, further comprising passing the at least one of the series of fast invalidation request messages through an intermediate switch.

11. A communication system comprising:
    a communication link;
    a root complex comprising:
       a link interface configured to be coupled to the communication link; and
       a control system configured to:
          insert a tag comprising an incrementing identifier into each of a series of fast invalidation request messages relating to an address translation table; and
          send the series of fast invalidation request messages over the communication link; and
    an endpoint comprising:
       an endpoint link interface configured to be coupled to the communication link; and
       an endpoint control system configured to:
          receive the series of fast invalidation request messages over the communication link; and
          detect a missing or corrupted fast invalidation request message within the series of fast invalidation request messages based on a missing incrementing identifier.

12. The communication system of claim 11, wherein the communication link comprises a Peripheral Component Interconnect (PCI) express (PCIe) link.

13. The communication system of claim 11, wherein the communication link comprises an intermediate switch.

14. The communication system of claim 11, wherein the endpoint control system is further configured to send an error message to the root complex on detection of the missing or corrupted fast invalidation request message.

15. The communication system of claim 11, wherein the endpoint control system is further configured to send an error message after receipt of a fast invalidation synchronization message from the root complex.

16. The communication system of claim 11, wherein the control system is further configured to resend fast invalidation request messages after a time out period.

17. The communication system of claim 11, wherein the endpoint further comprises registers configured to store incrementing identifiers.

18. The communication system of claim 11 comprising a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

19. An apparatus comprising:
    a root complex comprising:
       a link interface configured to be coupled to a communication link; and
       a control system configured to:
          insert a tag comprising an incrementing identifier into each of a series of fast invalidation request messages relating to an address translation table; and
          send the series of fast invalidation request messages over the communication link.

20. The apparatus of claim 19, wherein the control system is further configured to resend fast invalidation request messages after a time out period.

21. The apparatus of claim 19, wherein the control system is further configured to receive an error message from an endpoint over the communication link.

22. The apparatus of claim 21, wherein the control system is further configured to resend specific ones of the series of fast invalidation request messages based on the error message.

23. The apparatus of claim 19, wherein the control system is further configured to send a fast invalidation synchronization message.

24. The apparatus of claim 23, wherein the control system is further configured to receive an error message after sending the fast invalidation synchronization message.

25. The apparatus of claim 19, further comprising an integrated circuit (IC) comprising the root complex.

26. The apparatus of claim 19, further comprising a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

27. An apparatus comprising:
an endpoint comprising:
an endpoint link interface configured to be coupled to a communication link; and
an endpoint control system configured to:
receive a series of fast invalidation request messages over the communication link; and
detect a missing or corrupted fast invalidation request message within the series of fast invalidation request messages based on a missing incrementing identifier.

28. The apparatus of claim 27, wherein the endpoint further comprises a register to store incrementing identifiers.

29. The apparatus of claim 27, wherein the endpoint control system is further configured to send an error message after detecting the missing or corrupted fast invalidation request message.

30. The apparatus of claim 29, wherein the endpoint control system is further configured to send the error message after receipt of a fast invalidation synchronization message.

31. The apparatus of claim 27, wherein the endpoint control system is further configured to receive resent fast invalidation request messages.

32. The apparatus of claim 27, further comprising an integrated circuit (IC) comprising the endpoint.

33. The apparatus of claim 27, further comprising a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

34. A method for communicating over a communication link, comprising:
inserting a tag comprising an incrementing identifier into each of a series of fast invalidation request messages relating to an address translation table; and
sending the series of fast invalidation request messages over the communication link.

35. A method for communicating over a communication link, comprising:
receiving a series of fast invalidation request messages over the communication link; and
detecting a missing or corrupted fast invalidation request message within the series of fast invalidation request messages based on a missing incrementing identifier.

* * * * *